United States Patent
Lyle

(10) Patent No.: US 7,529,242 B1
(45) Date of Patent: May 5, 2009

(54) ROUTING NETWORK PACKETS FOR MULTI-PROCESSOR NETWORK FLOW ANALYSIS

(75) Inventor: Michael P. Lyle, San Jose, CA (US)

(73) Assignee: Symantec Corporation, Cupertino, CA (US)

( * ) Notice: Subject to any disclaimer, the term of this patent is extended or adjusted under 35 U.S.C. 154(b) by 808 days.

(21) Appl. No.: 10/076,952

(22) Filed: Feb. 15, 2002

(51) Int. Cl.
H04L 12/28 (2006.01)

(52) U.S. Cl. .................. 370/392; 370/395.32; 726/23; 713/154

(58) Field of Classification Search ............ 370/395.31, 370/395.2, 395.3–395.32, 409, 351, 355, 370/356, 392, 397, 389, 393, 394; 713/153–154; 726/22–26; 709/223–229
See application file for complete search history.

(56) References Cited

U.S. PATENT DOCUMENTS

| | | | |
|---|---|---|---|
| 5,557,742 A | 9/1996 | Smaha et al. ............... 395/186 |
| 6,321,338 B1 | 11/2001 | Porras et al. | |
| 6,484,203 B1 | 11/2002 | Porras et al. | |
| 6,578,147 B1 * | 6/2003 | Shanklin et al. ............... 726/22 |
| 6,631,422 B1 * | 10/2003 | Althaus et al. .............. 709/250 |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,778,495 B1 * | 8/2004 | Blair .......................... 370/230 |
| 6,904,040 B2 * | 6/2005 | Salapura et al. ........ 370/395.32 |
| 7,133,405 B2 * | 11/2006 | Graham et al. .............. 370/392 |
| 7,248,585 B2 * | 7/2007 | Kohn et al. .................. 370/392 |
| 7,254,639 B1 * | 8/2007 | Siegel et al. ................. 709/238 |
| 2003/0043825 A1 * | 3/2003 | Magnussen et al. ......... 370/401 |
| 2003/0067934 A1 * | 4/2003 | Hooper et al. .............. 370/428 |
| 2003/0188089 A1 * | 10/2003 | Perloff ....................... 711/108 |

* cited by examiner

Primary Examiner—Aung S Moe
Assistant Examiner—Habte Mered
(74) Attorney, Agent, or Firm—Van Pelt, Yi & James LLP

(57) ABSTRACT

A system and method are disclosed for routing data packets for network flow analysis by a multi-processor system. A data packet comprising data sufficient to identify a network connection with which the data packet is associated is received. A hash value is calculated based on the data sufficient to identify the network connection with which the data packet is associated. The data packet is assigned, based on the hash value, to one of the plurality of processors for analysis.

18 Claims, 7 Drawing Sheets

ROUTING NETWORK PACKETS FOR MULTI-PROCESSOR NETWORK FLOW ANALYSIS

CROSS REFERENCE TO RELATED APPLICATIONS

This application is related to co-pending U.S. patent application Ser. No. 09/615,676 entitled SYSTEM AND METHOD FOR TRACKING THE SOURCE OF A COMPUTER ATTACK, filed Jul. 14, 2000, which is incorporated herein by reference for all purposes; and co-pending U.S. patent application Ser. No. 09/964,272 entitled SYSTEM AND METHOD FOR ANALYZING PROTOCOL STREAMS FOR A SECURITY-RELATED EVENT, filed Sep. 25, 2001, which is incorporated herein by reference for all purposes.

FIELD OF THE INVENTION

The present invention relates generally to computer security. More specifically, a system and method for routing network packets for multi-processor network flow analysis is disclosed.

BACKGROUND OF THE INVENTION

Security systems have been provided for real-time analysis of network flows to identify possible attacks or intrusions. For example, co-pending U.S. patent application Ser. No. 09/615,676, entitled SYSTEM AND METHOD FOR TRACKING THE SOURCE OF A COMPUTER ATTACK and incorporated herein by reference above, describes several embodiments of such a system. Such systems may employ a software process, referred to as a "sniffer" process in the above-referenced application, to analyze network flows in an effort to identify possible security-related events that may warrant further analysis or responsive action. One approach, described for example in the above-referenced application, is to analyze network flows for patterns or "signatures" that are associated with known types of attacks. Another approach, described for example in co-pending U.S. patent application Ser. No. 09/964,272 entitled SYSTEM AND METHOD FOR ANALYZING PROTOCOL STREAMS FOR A SECURITY-RELATED EVENT and incorporated herein by reference above, is to model normal and permissible network protocol behavior so that deviations from such normal and permissible flows may be detected. Still other systems may try to match network traffic with a set of stored signatures associated with a particular prior intrusion or type of intrusion or attack, such as a system of the type describe in U.S. Pat. No. 5,557,742, entitled, METHOD AND SYSTEM FOR DETECTING INTRUSION INTO AND MISUSE OF A DATA PROCESSING SYSTEM.

In many applications, speed of analysis is an important performance criterion for such systems. For example, an internal corporate network connected to an external network such as the Internet, or a system or set of systems used to provide a website via the Internet, may receive a huge volume of network traffic in a short period of time. In addition, multiple different host systems may connect via the external network to the internal network or system, each connection effectively representing a "conversation" carried on by exchanging numerous data packets between the participating host systems. A security system deployed to protect such a network or system against attack must be able to process in a timely manner the many data packets received via the external network as part of these various conversations.

One way to improve the speed and performance of a security system such as described above would be to employ a multi-processor system. Such systems comprise more than one microprocessor, each one being configured to operate independently of the others. As a result, in such a system multiple processors may operate in parallel, increasing the speed with which operations may be performed. However, to use such a multi-processor system for network flow analysis, it is necessary to ensure that the packets associated with a particular connection between an external host system and a protected internal host system are all routed to the same processor, so that that processor will have all of the data packets needed to analyze the flow of packets on that connection. In addition, the packets for a particular connection must all be routed to the same processor in a manner that maximizes the speed advantage that it is possible to attain through use of a multi-processor system, such as by maximizing the extent to which analysis of multiple connections may occur concurrently.

SUMMARY OF THE INVENTION

A system and method for routing network packets for multi-processor network flow analysis is disclosed. Data packets associated with an external network connection are received and routed to a particular one of the multiple processors in a multi-processor system in a manner that ensures that all packets associated with a particular connection are routed to the same processor. In one embodiment, this is accomplished by taking a hash of data associated with each data packet that identifies the data packet as one associated with a particular connection, such as a hash of the source and destination addresses of data packets sent using the TCP/IP protocol suite.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a data packet comprising data sufficient to identify a network connection with which the data packet is associated is received. A hash value is calculated based on the data sufficient to identify the network connection with which the data packet is associated. The data packet is assigned, based on the hash value, to one of the plurality of processors for analysis.

In one embodiment, a system is provided in which a plurality of processors are configured to perform network flow analysis. The system also comprises a network interface card configured to receive data packets via a network connection. The system also includes a driver configured to calculate a hash value based on data sufficient to identify the network connection with which a received data packet is associated and assign the data packet based on the hash value to one of said plurality of processors for analysis.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
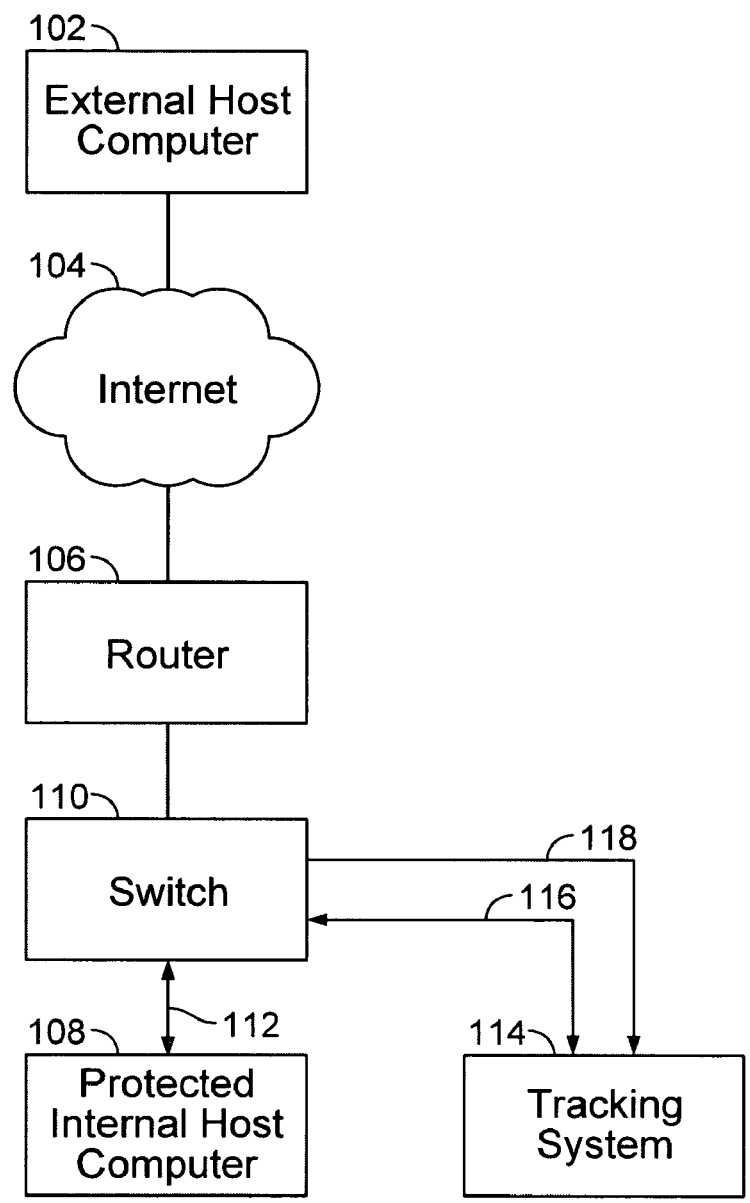
FIG. 1 is an illustration of a system used in one embodiment to route network packets for multi-processor network flow analysis.

FIG. 1 is an illustration of a system used in one embodiment to route network packets for multi-processor network flow analysis. An external host computer 102 is connected via the Internet 104 to a router 106. The router 106 is associated with a protected internal host computer system 108, which is connected to the router 106 via a switch 110. While FIG. 1 shows only a single external host computer 102 for purposes of illustration, many host computer systems may be configured to connect to internal host computer system 108 via the Internet 104. For convenience, in FIG. 1 only a single host computer is shown. Similarly, while only a single internal host computer system 108 is shown, in some embodiments multiple internal host computer systems may be connected to the Internet 104, or some other external network, via one or more switches such as switch 110.

The protected internal host computer system 108 is connected to the switch 110 via a network connection 112. A tracking system 114 is also connected to the switch 110 via a network connection 116. The network connection 116 enables the tracking system to communicate with other systems, such as the protected internal host system 108 or the router 106, via switch 110. The tracking system 114 is also connected to switch 110 by a copy port connection 118. In one embodiment, the tracking system is configured to invoke the copy port functionality of switch 110 to obtain form switch 110 a copy, sent to tracking system 114 via the copy port connection 118, of all network traffic that passes through a specified port. In a packet-switched network (PSN), such as a network that uses the TCP/IP suite of protocols (e.g., the Internet), messages from one computer to another are embodied in one or more data packets, which are sent via the network from the sending computer (i.e., the source) to a recipient computer (i.e., the destination), where the packets are reassembled (if necessary) to reconstruct the complete message being sent by the sending computer. Under the TCP/IP suite of protocols, each packet has a header portion, which contains, inter alia, address information. Specifically, the header comprises the Internet Protocol (IP) address of the source computer, the port used by the source computer to send the packet, the IP address of the destination computer, and the port being used by the destination computer to receive data packets associated with the connection being maintained between the source computer and the destination computer. By using the "copy port" functionality of switch 110, the tracking system 114 is therefore able to receive a copy of all data packets sent to or from a designated port on the protected internal host computer system 108. The monitoring of network flows in this manner is described more fully in U.S. patent application Ser. No. 09/615,676, which is incorporated herein by reference above.

While FIG. 1 shows only a single protected internal host computer system 108, the tracking system 114 may be associated with a plurality of protected internal host computer systems connected to router 106 via switch 110. Likewise, while only one tracking system 114 is shown, multiple tracking systems may be employed to protect an internal computer network, depending on the configuration of the network being protected and the characteristics of the tracking systems employed.

Figure 2:
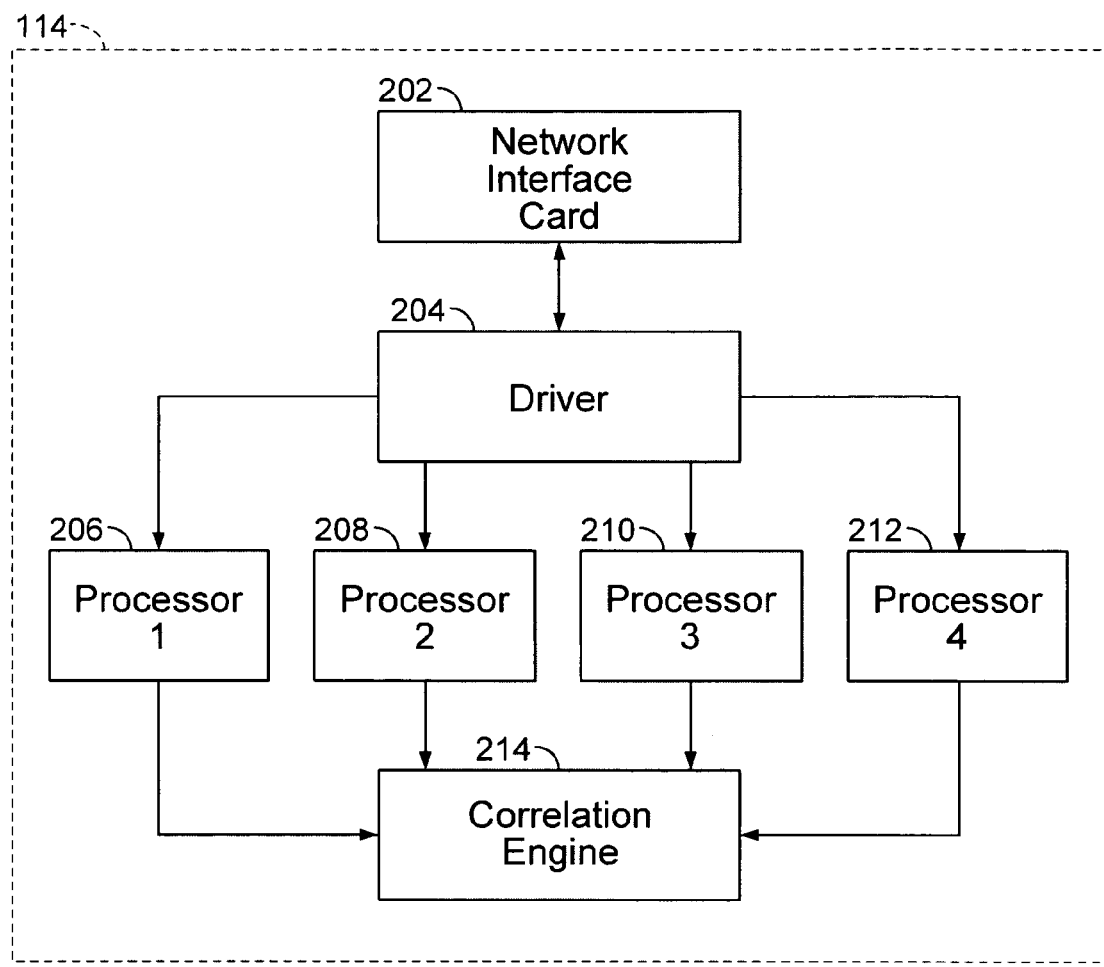
FIG. 2 is a schematic diagram of relevant portions of a tracking system 114, such as shown in FIG. 1.

FIG. 2 is a schematic diagram of relevant portions of a tracking system 114, such as shown in FIG. 1. The tracking system 114 comprises a network interface card (NIC) 202 configured to receive network and data packets over a network connection to the tracking system 114, such as copy port connection 118 of FIG. 1. The network interface card 202 interacts with a driver 204. In one embodiment, the network interface card 202 is configured to interrupt the driver 204 to inform the driver 204 that the network interface card 202 has received one or more packets of data. The network interface card 202 may use one or more of various well-known criteria and algorithms to determine when to send an interrupt message to the driver 204.

The tracking system 114 further comprises a plurality of processors 206, 208, 210, and 212. In one embodiment, the driver 204 is configured to route each data packet received by the network interface card 202 to a respective one of the plurality of processors 206, 208, 210, and 212, in such a manner that packets associated with a particular network connection are always routed to the same processor, as described more fully below. In one embodiment, as described more fully below, the driver 204 combines the source and the destination addresses (IP address and port number), calculates a hash value based on the combined address data, and routes the data packet to a particular processor based on the two least significant bits of the hash value. Each of the processors 206, 208, 210, and 212 is configured to perform a "sniffer" process, such as described above and discussed more fully below in connection with FIG. 7, and each is configured to communicate with a correlation engine module 214 with respect to any network flow or connection identified as warranting further analysis for responsive action.

Figure 3:
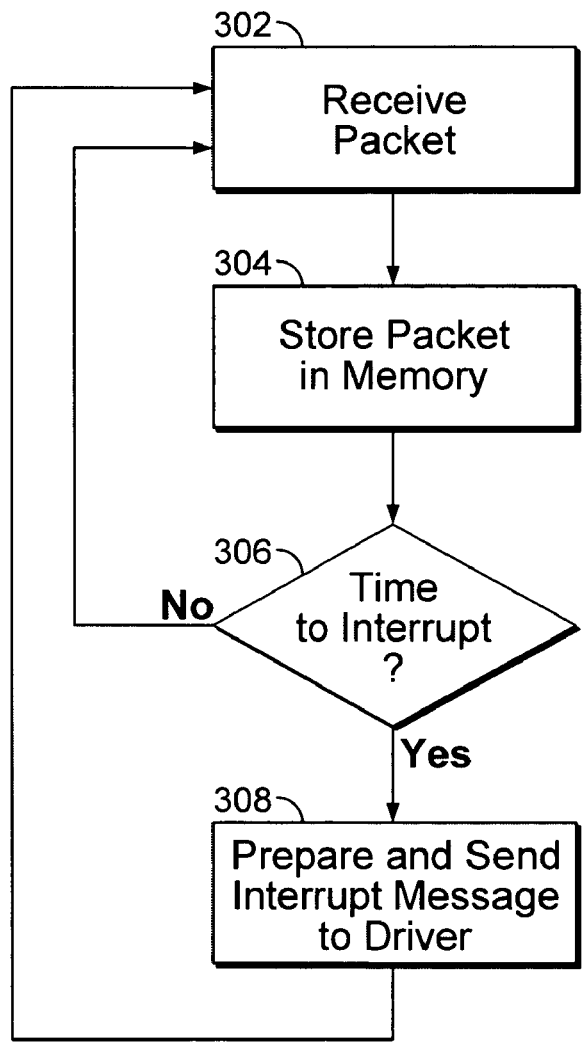
FIG. 3 is a flow chart illustrating a process implemented in one embodiment on the network interface card 202.

FIG. 3 is a flow chart illustrating a process implemented in one embodiment on the network interface card 202. The process begins in step 302 in which a data packet is received. In step 304, the data packet is stored in the tracking system host memory via direct memory access (DMA).

In step 306, the network interface card determines whether or not an interrupt message should be sent to the driver 204 to inform the driver that one or more data packets are ready to be processed. In one embodiment, the logic upon which the network interface card makes the determination as to whether it is time to interrupt the driver or not is based at least in part on the amount of time that has elapsed since the last interrupt. In one embodiment, the determination is made at least in part based on information from the driver concerning how busy the driver is. In one embodiment, the determination is made at least in part based on the number of storage locations available to the network interface card to store subsequently-received network data packets.

If it is determined in step 306 that it is not yet time to interrupt the driver 204, the process shown in FIG. 3 returns to step 302 and the network interface card waits for the next data packet to be received. If it is determined in step 306 that it is time to interrupt the driver 204, the process proceeds to step 308 in which the network interface card prepares and sends an interrupt message to the driver. In one embodiment, the interrupt message comprises data identifying the storage location in which the network interface card has stored each data packet that has been received by the network interface card subsequent to the last-received data packet associated with the last interrupt message sent to the driver. In one embodiment, the driver may instead receive data into storage locations previously identified during the initialization of the card and set a bit within them indicating that data has been received.

In one embodiment, the network interface card sends data packets to the driver in the order in which they were received. The driver likewise processes the data packets in the order in which they were received and identified to the driver by the network interface card. The driver then places each data packet, in the order received, in the work queue associated with the processor being used to analyze the network flow for the connection with which the data packet is associated. As a result, each processor receives in its work queue, the data packets for the connections it is analyzing in the order in which they were received by the network interface card. In most cases, this approach results in the processors receiving data packets for analysis in the order in which they were sent (since in practice packets tend to be received in the order in which they were sent), which minimizes the time and computing resources needed to reorder packets.

Figure 4:
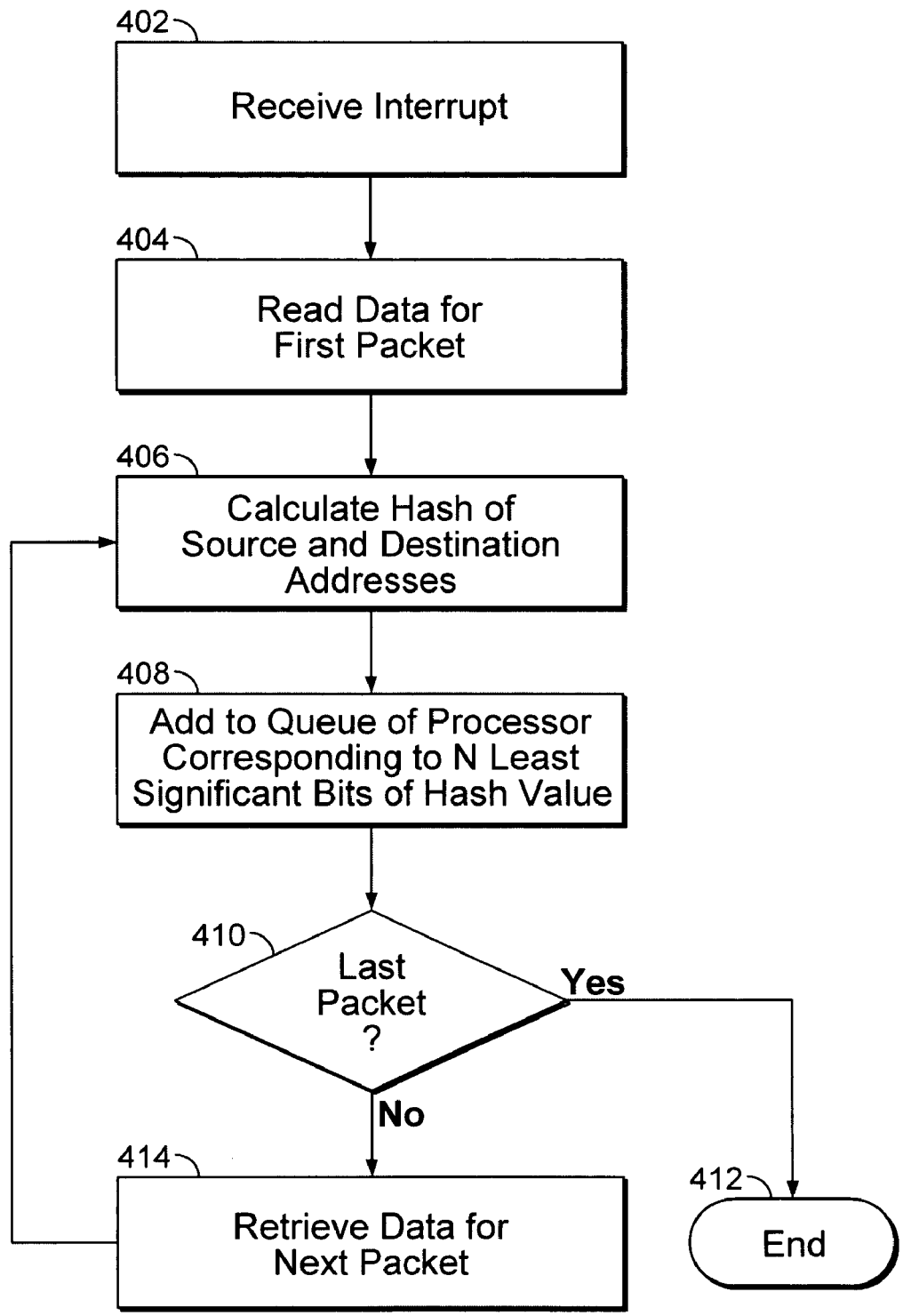
FIG. 4 is a flowchart illustrating a process implemented in one embodiment on the driver 204 to direct network data packets to a respective one of the plurality of processors 206, 208, 210, and 212 for processing.

FIG. 4 is a flowchart illustrating a process implemented in one embodiment on the driver 204 to direct network data packets to a respective one of the plurality of processors 206, 208, 210, and 212 for processing. The process begins in step 402 in which an interrupt message is received from the network interface card 202. In one embodiment, the driver operates in a mode that enables it to process all data packets on the network link, often referred to as "promiscuous" mode. In step 404, the driver reads from the tracking system host memory at least a portion of the data for the first data packet identified in the interrupt message. The driver does not receive or create a copy of the data, but instead uses the storage location information included in the interrupt message to read the data needed from the storage location in the tracking system host memory in which the network interface card has stored the data packet.

In step 406, the driver calculates a hash value based on the source and destination addresses used to identify the source and destination, respectively, of the data packet. In one embodiment, the address data comprises an IP address and port number for the source and an IP address and port number for the destination. In other embodiments, other addressing information is used. The only requirement is that the information used to calculate the hash value be the same for each data packet associated with the connection of which the data packet is a part, so that when the hash value is computed it will be the same for all of the packets associated with the connection with the result that all of the packets associated with the connection will be sent to the same processor.

Once the hash value has been calculated in step 406, in step 408 the driver adds the data packet to the analysis queue of the processor corresponding to the hash value. In one embodiment, the tracking system compromises $2^n$ processors and the n least significant bits (LSB) of the hash value determines the processor to which the data packet is assigned. For example, if the tracking system has four processors, n=2 (because $2^2$=4) and the two least significant bits of the hash value are used to route each respective data packet to one of the four processors. Likewise, if the tracking system has eight processors, n=3 and the three least significant bits of the hash value are used. In other embodiments, other mathematical combinations or transforms are used to route each respective data packet to the appropriate processor, based on data that is the same for each data packet that is part of the same connection.

In one embodiment, multiple tasks may run on each processor. For example, in one embodiment $2^n$ tasks run on $2^{n-1}$ processors, with each processor running two tasks (e.g., 8 tasks on 4 processors). This scheme enables the system to maximize the use of the available processors, even if the split of information flows between tasks is uneven.

The specific manner in which the data packet is added to the queue for the corresponding processor is described more fully below. In assigning the data packet to a queue for the processor corresponding to the hash value determined in step 406, the driver does not make a copy of the data packet but instead passes on to the processor the data received from the network interface card identifying the storage location in the tracking system memory in which the data packet was stored by the network interface card, as explained more fully below.

In step 410, the driver determines whether the packet just added to the queue of the corresponding processor in step 408 was the last data packet identified in the interrupt message received from the network interface card in step 402. If it is determined in step 410 that the data packet sent to the processor queue in step 408 was the last packet included in the interrupt message received in step 402, the process proceeds to step 412 in which the process ends until the next interrupt message, if any, has been received. If it is determined in step 410 that the data packet sent to the processor queue in step 408 was not the last data packet in the interrupt message received from the network interface card in step 402, the process proceeds to step 414 in which the driver retrieves data for the next data packet in the interrupt message from the storage location in the tracking system host memory identified in the interrupt message. The process then returns to step 406 in which a hash value is calculated for said next data packet. The steps 406, 408, and 410 are then repeated for each subsequent data packet in the interrupt message until it is determined in step 410 that the last data package identified in the interrupt message has been processed.

Figure 5:
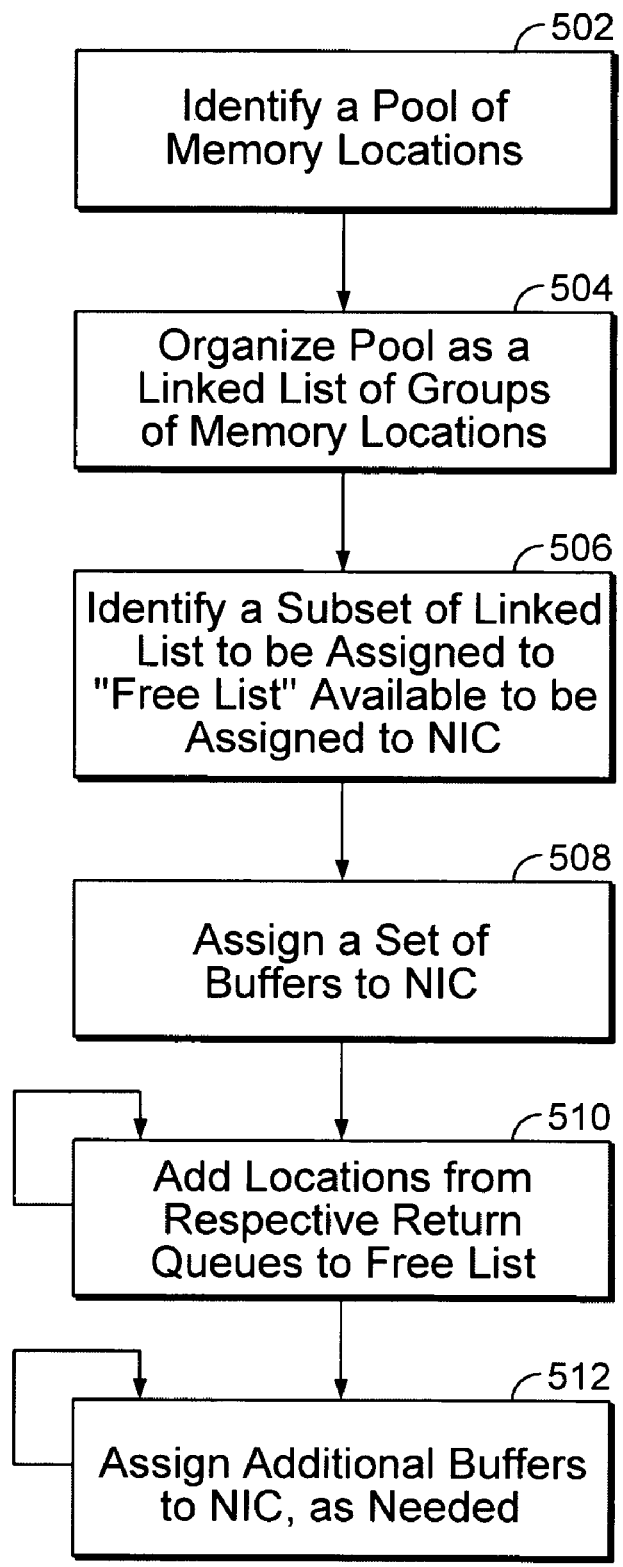
FIG. 5 is a flow chart of a process used in one embodiment to allocate tracking system host memory storage locations to the network interface card for the storage of incoming data packets.

FIG. 5 is a flow chart of a process used in one embodiment to allocate tracking system host memory storage locations to the network interface card for the storage of incoming data packets. The process begins in step 502 in which a block of memory storage locations are allocated to the driver. In one embodiment, the amount of memory allocated to the driver may be on the order of 128 megabytes, for example.

In step 504, the memory pool allocated to the driver is organized as a linked list of groups of memory locations. Linked lists are well known. In a linked list each group of storage locations is associated with a pointer, which identifies the group of storage locations, and each group of storage locations is provided with the pointer to the next group of storage locations in the list. In one embodiment, a memory pool on the order of 128 megabytes is organized into 2048 byte groups of storage locations. In one embodiment, 2048 byte groups are used because 1500 bytes is the maximum size of an Ethernet frame and 2048 is the next power of 2 above 1500. In one embodiment, buffers of varying sizes are used, depending on the amount of data received in a packet.

In step 506, a subset of the linked list of storage locations is identified and assigned to a "free list" of available storage locations not currently being used by the driver for some other purpose, such as to be assigned to a processor for use as a work queue, as described more fully below.

In step 508, a set of groups of storage locations, sometimes referred to herein as buffers, are assigned by the driver to the network interface card for use in storing received data packets. In one embodiment, the number of buffers assigned to the network interface card at any given time is on the order of 16 to 256 buffers at a time. In one embodiment, the number of buffers assigned, or the range of number of buffers that may be assigned, is based on the characteristics and capabilities of the network interface card being used.

In step 510, the driver reads from a return queue associated with each respective processor (return queues are described more fully below) data identifying which storage locations contain network data packet data that has already been processed by the processor, such that the storage locations may be made available for other uses. Storage locations listed in the return queue associated with any processor are added by the driver to the free list of storage locations available for assignment to the network interface card for the storage of subsequently received network data packets. The processor return queues are described more fully below. Step 510 of the process shown in FIG. 5 is repeated periodically as additional storage locations are added by the processors to their respective return queues.

In step 512, the driver assigns additional buffers to the network interface card, as needed, to insure that the network interface card has sufficient storage locations available to store all of the incoming data packets. Step 512 is repeated as necessary to insure that the network interface card always has a sufficient number of buffers available to store incoming packets.

Figure 6A:
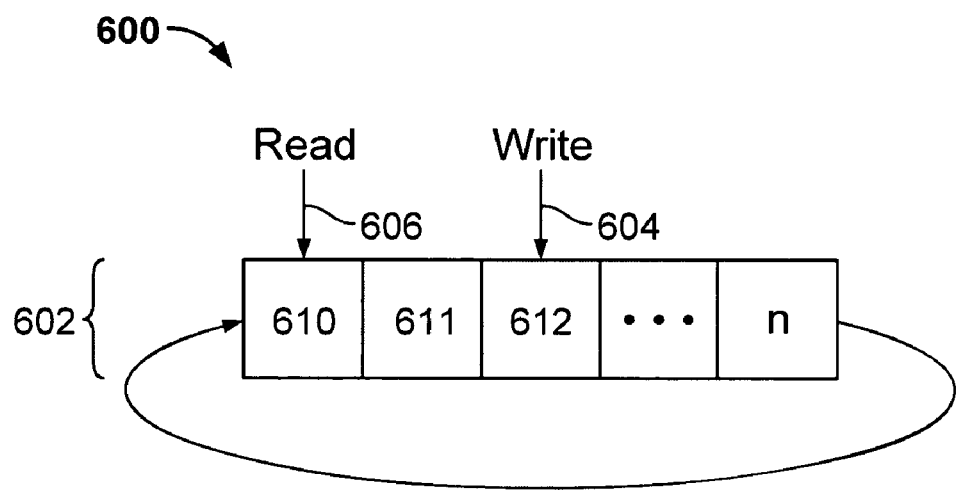
FIG. 6A is an illustration of a work queue used in one embodiment to assign data packets to a processor for processing.

FIG. 6A is an illustration of a work queue used in one embodiment to assign data packets to a processor for processing. In one embodiment, the work queue 600 is a circular buffer comprising a plurality of memory storage locations 602, numbered 610 through "n" in FIG. 6A. A write head 604 is used to identify the next storage location in the circular buffer in order that is available to receive from the driver data indicating the storage location of a data packet to be processed by the processor associated with the work queue. The work queue 600 further comprises a read head 606. The read head 606 identifies the next storage location in the circular buffer in order to be read by the processor when the processor is ready to begin processing the next data packet. As described above, the driver writes to the work queue data indicating the storage location used to store a data packet to be processed by the processor associated with the particular work queue 600. The processor then reads from the same work queue, using the read head 606 to identify the next location to be read, and uses the data stored in the work queue by the driver to read the data packet data from the tracking system host memory storage location in which the network interface card stored the data packet.

Circular buffers such as work queue 600 are well known. In such a buffer, once the write head 604 or the read head 606 reaches the final storage location, identified by the number n in FIG. 6A, the head then returns to the first storage location in the buffer, identified by the number 610 in FIG. 6A. The circular buffer 600 is configured such that the read head 606 never overtakes the write head 604, so that the processor never reads data from a storage location in the work queue before the driver has had a chance to write new data to that storage location.

Figure 6B:
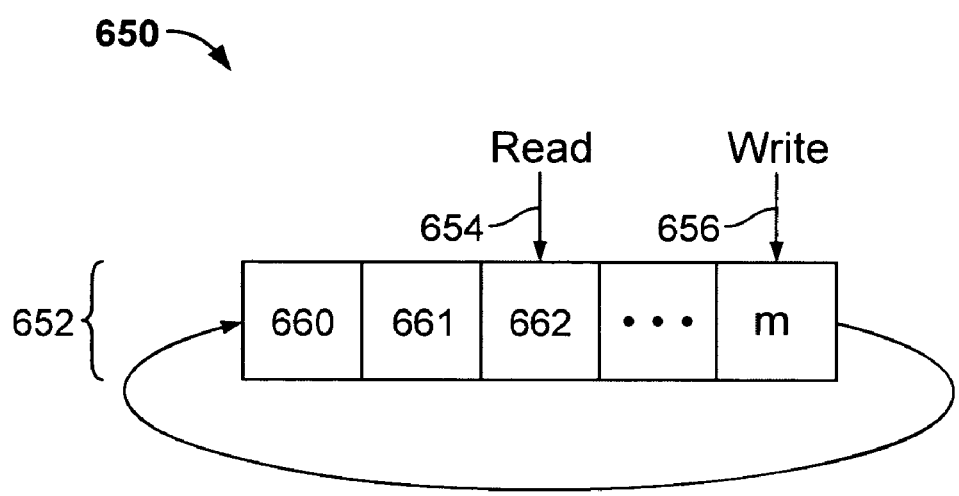
FIG. 6B is an illustration of a return queue 650 used in one embodiment to enable the processor to inform the driver that the processor has completed processing a data packet, so that the driver may make the tracking system host memory storage location in which the data packet is stored available for other uses.

FIG. 6B is an illustration of a return queue 650 used in one embodiment to enable the processor to inform the driver that the processor has completed processing a data packet, so that the driver may make the tracking system host memory storage location in which the data packet is stored available for other uses. In one embodiment, each processor of the multi-processor tracking system is associated with a return queue. The return queue 650 is a circular buffer in one embodiment. As shown in FIG. 6B, the return queue 650 comprises a plurality of storage locations 652, identified in FIG. 6B as number 660 through "m". The return queue 650 has a read head 654, used to identify the next location in the return queue to be read by the driver. Once the driver has read the data stored in the storage location of the return queue at which the read head is pointing, the read head is advanced to the next storage location in the queue. The return queue 650 further comprises a write head 656, used to identify the next storage location in order of the return queue that is available to receive data from the processor identifying the storage location of a data packet that the processor has finished processing. As in the work queue shown in FIG. 6A, in the return queue shown in FIG. 6B the read head 654 is configured such that it will never overtake the write head 656, so that the driver never reads from a storage location in the return queue until after the processor has had an opportunity to write new data to that storage location.

Figure 7:
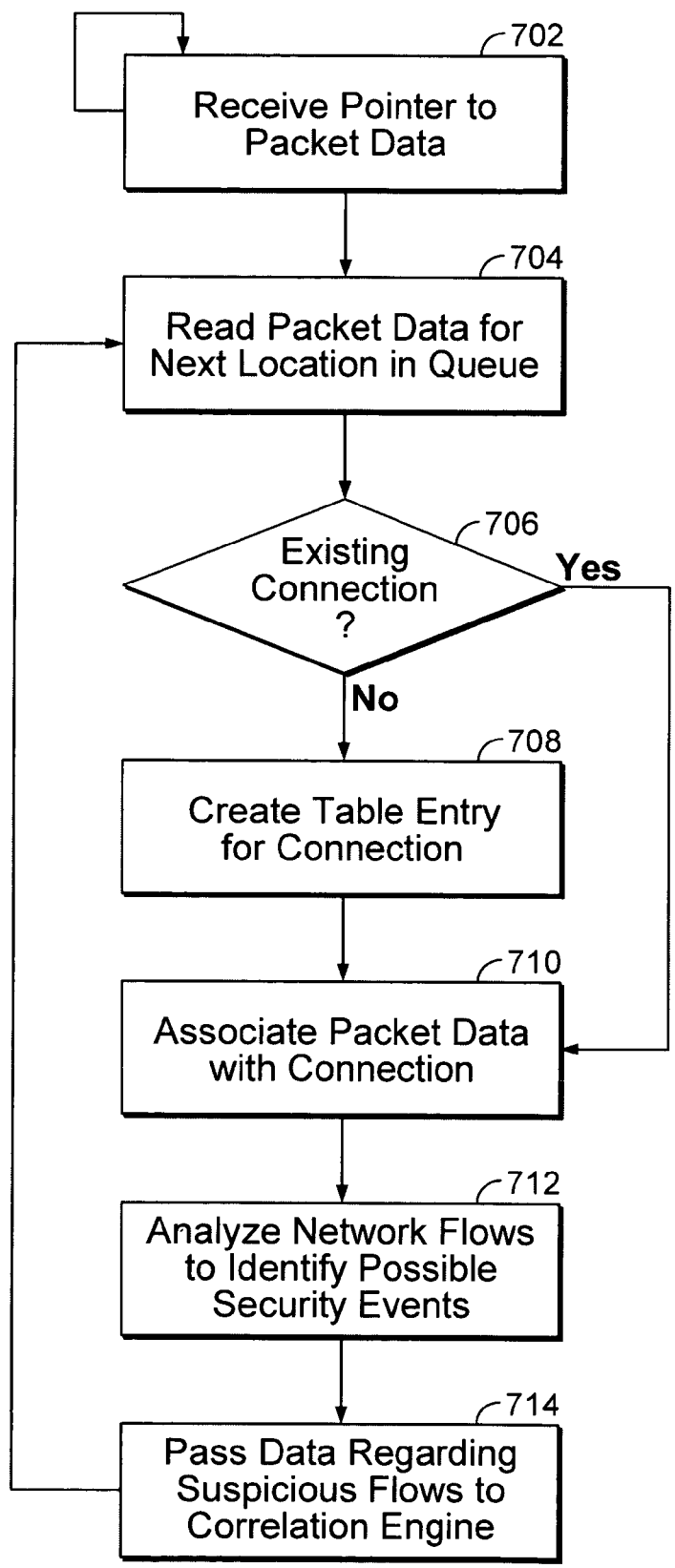
FIG. 7 is a flow chart illustrating a "sniffer" process implemented in one embodiment on each processor of a multi-processor tracking system to analyze network flows for possible security-related events.

FIG. 7 is a flow chart illustrating a "sniffer" process implemented in one embodiment on each processor of a multi-processor tracking system to analyze network flows for possible security-related events. In one embodiment, each processor is configured to run multiple instances of the process shown in FIG. 7, if necessary to analyze the respective network flow associated with each network connection being monitored by the tracking system. The process begins in step 702 in which a pointer to a data packet to be analyzed by the processor is received. In one embodiment, as described above, the pointer is received by operation of the driver, which writes the pointer a storage location in the work queue for the processor, such as the work queue 600 shown in FIG. 6A.

In one embodiment, the sniffer process running on the processor reads the pointer data from the next storage location in the work queue associated with the processor. The sniffer process then uses the pointer data to read the packet data directly from the tracking system host memory storage location in which it is stored (and to which the pointer points). By reading the packet data from the tracking system memory, from the location in which it was stored by the network interface card, the sniffer process conserves computing resources and saves time by not making or retrieving a copy of the data packet data. In one embodiment, each sniffer process has direct memory access to the entire range of memory storage locations in which incoming data packets may be stored by the network interface card.

In step 706, it is determined whether the data packet read in step 704 is associated with a connection already being analyzed by the processor. In one embodiment, the sniffer process checks a table of connections currently being analyzed by the processor and compares the address information for the data packet read in step 704 with the table entries to determine if there is a match. If it is determined in step 706 that the data packet read in step 704 is associated with a connection already being tracked and analyzed by the processor, the process proceeds to step 710, in which the data packet read in step 704 is associated with the connection of which it is a part. If it determined in step 706 that the data packet is not associated with any connection already being analyzed by the processor, the process proceeds to step 708 in which a new entry is made—for the connection of which the data packet read in step 704 is a part—in the table of connections being analyzed by the processor. Once the new table entry has been made in step 708, the process proceeds to step 710 in which the data packet data read in step 704 is associated with the connection of which it is a part.

Once the data packet read in step 704 has been associated with a connection being analyzed by the processor in step 710, the process proceeds to step 712 in which the sniffer process analyzes the network flow of the connection with which the data packet is associated to determine if any possible security-related events have occurred. In one embodiment, as described above, the sniffer process analyzes the network flows by searching them for known patterns or strings of characters associated with known attacks or types of attack. In one embodiment, as described above, the tracking system is provided with a model of the normal and permissible network flows under the applicable network protocol or suite of protocols and identifies security-related events by searching for deviations from the normal and permitted behavior.

In step 714, a sniffer process passes data regarding any suspicious network flow to the correlation engine process running on the tracking system computer, such as the correlation engine 214 of FIG. 2. The further processing of network flows identified as suspicious by the sniffer process is described in detail in co-pending U.S. patent application Ser. No. 09/615,676, which is incorporated herein by reference above.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for routing data packets for network flow analysis by a multi-processor system having a plurality of processors, comprising:
    receiving a data packet, the data packet comprising data sufficient to identify a network connection with which the data packet is associated;
    calculating a hash value based on said data sufficient to identify the network connection with which the data packet is associated; and
    assigning the data packet based on said hash value to one of said plurality of processors for analysis by using a number of bits of the hash value, wherein the number of bits used is not necessarily the total number of bits of the hash value and the number of bits used is determined at least in part by the number of processors included in said plurality of processors; wherein each of at least a subset of processors comprising said plurality of processors is configured to perform concurrently two or more network flow analysis related tasks;
    wherein the data packet is assigned to said one of said plurality of processors by storing, in a work queue associated with said one of said plurality of processors, a pointer to a storage location in which data comprising the data packet is stored; and the processor is configured to read the pointer, use the pointer to read the data comprising the data packet directly from the storage location in which said data comprising the data packet is stored, use the data comprising the data packet to perform a network flow analysis with respect to a network flow with which the data packet is associated, and store in a return queue associated with the processor a data indicating that the processor is finished processing the data comprising the data packet; and wherein the data indicating that the processor is finished processing the data comprising the data packet is used to determine that the storage location is available to be used to store a subsequently received data comprising a subsequently received data packet; and further comprising reading the pointer from the return queue and using the pointer read from the return queue to add the storage location to a free list of storage locations available to be assigned to a network communication interface configured to receive the subsequently received data packet and to store said subsequently received data comprising the subsequently received data packet.

2. The method of claim 1, wherein said data sufficient to identify the network connection with which the data packet is associated comprises address data.

3. The method of claim 1, wherein said data sufficient to identify the network connection with which the data packet is associated comprises address data associated with a source computer that sent the data packet and address data associated with a destination computer to which the data packet is addressed.

4. The method of claim 1, wherein the data packet is sent using the TCP/IP suite of protocols and said data sufficient to identify the network connection with which the data packet is associated comprises an IP address and port number associated with the source computer that sent the data packet and an IP address and port number associated with the destination computer to which the data packet is addressed.

5. The method of claim 1, the storage location comprises a location in a host memory associated with the multi-processor system.

6. The method of claim 5, further comprising sending an interrupt message to a driver, the interrupt message comprising data identifying the storage location in host memory in which the data packet is stored.

7. The method of claim 1, wherein said work queue is a circular queue.

8. The method of claim 1, further comprising associating the data packet with one or more other data packets associated with the same network connection with which the received data packet is associated to recreate a network flow associated with said network connection.

9. The method of claim 8, further comprising analyzing the network flow to determine if any security-related event has occurred.

10. The method of claim 9, wherein a security-related event is determined to have occurred if the network flow matches a pattern associated with a known attack.

11. The method of claim 9, wherein a security-related event is determined to have occurred if the network flow deviates from normal and permissible behavior under the network protocol under which the data packet was sent.

12. A computer readable storage medium embodied with a computer program product for routing data packets for a network flow analysis by a multi-processor system, the computer program product executed by the multi-processor system, comprises computer instructions for:

receiving a data packet, the data packet comprising data sufficient to identify a network connection with which the data packet is associated;

calculating a hash value based on said data sufficient to identify the network connection with which the data packet is associated; and assigning the data packet based on said hash value to a processor of said multi-processor system for analysis by using a number of bits of the hash value, wherein the number of bits used is not necessarily the total number of bits of the hash value and the number of bits used is determined at least in part by the number of processors included in said plurality of processors; wherein each of at least a subset of processors comprising said plurality of processors is configured to perform concurrently two or more network flow analysis related tasks;

wherein the data packet is assigned to said one of said plurality of processors by storing, in a work queue associated with said one of said plurality of processors, a pointer to a storage location in which data comprising the data packet is stored; and the processor is configured to read the pointer, use the pointer to read the data comprising the data packet directly from the storage location in which said data comprising the data packet is stored, use the data comprising the data packet to perform a network flow analysis with respect to a network flow with which the data packet is associated, and store in a return queue associated with the processor a data indicating that the processor is finished processing the data comprising the data packet; and wherein the data indicating that the processor is finished processing the data comprising the data packet is used to determine that the storage location is available to be used to store a subsequently received data comprising a subsequently received data packet; and further comprising computer instructions for reading the pointer from the return queue and using the pointer read from the return queue to add the storage location to a free list of storage locations available to be assigned to a network communication interface configured to receive the subsequently received data packet and to store said subsequently received data comprising the subsequently received data packet.

13. A system for routing data packets for network flow analysis, comprising:

a plurality of processors configured to perform network flow analysis; wherein each of at least a subset of processors comprising said plurality of processors is configured to perform concurrently two or more network flow analysis related tasks;

a network interface card configured to receive data packets via a network connection, each data packet comprising data sufficient to identify a network connection with which the data packet is associated; and a driver configured to:

calculate a hash value based on said data sufficient to identify the network connection with which the data packet is associated; and assign the data packet based on said hash value to one of said plurality of processors for analysis by using a number of bits of the hash value, wherein the number of bits used is not necessarily the total number of bits of the hash value and the number of bits used is determined at least in part by the number of processors included in said plurality of processors;

wherein the data packet is assigned to said one of said plurality of processors by storing, in a work queue associated with said one of said plurality of processors, a pointer to a storage location in which data comprising the data packet is stored; and the processor is configured to read the pointer, use the pointer to read the data comprising the data packet directly from the storage location in which said data comprising the data packet is stored, use the data comprising the data packet to perform a network flow analysis with respect to a network flow with which the data packet is associated, and store in a return queue associated with the processor a data indicating that the processor is finished processing the data comprising the data packet; and wherein the data indicating that the processor is finished processing the data comprising the data packet is used to determine that the storage location is available to be used to store a subsequently received data comprising a subsequently received data packet; and wherein the driver is further configured to read the pointer from the return queue and use the pointer read from the return queue to add the storage location to a free list of storage locations available to be assigned to the network interface card.

14. The system of claim 13, wherein said data sufficient to identify the network connection with which the data packet is associated comprises address data.

15. The system of claim 13, wherein said data sufficient to identify the network connection with which the data packet is associated comprises address data associated with a source computer that sent the data packet and address data associated with a destination computer to which the data packet is addressed.

16. The system of claim 13, wherein the data packet is sent using the TCP/IP suite of protocols and said data sufficient to identify the network connection with which the data packet is associated comprises an IP address and port number associated with the source computer that sent the data packet and an IP address and port number associated with the destination computer to which the data packet is addressed.

17. The system of claim 13, wherein the driver is further configured to associate the data packet with one or more other data packets associated with the same network connection with which the received data packet is associated to recreate a network flow associated with said network connection.

18. The system of claim 17, wherein the driver is further configured to analyze the network flow to determine if any security-related event has occurred.

* * * * *